(12) United States Patent
Masri et al.

(10) Patent No.: US 8,010,103 B2
(45) Date of Patent: Aug. 30, 2011

(54) PASSIVE AND ACTIVE SCANNING IN WIRELESS NETWORK

(75) Inventors: Ahmad Masri, Nahif Village (IL); Alexander Tolpin, Netanya (IL)

(73) Assignee: Intel Corporation, Santa Clara, CA (US)

( * ) Notice: Subject to any disclaimer, the term of this patent is extended or adjusted under 35 U.S.C. 154(b) by 1372 days.

(21) Appl. No.: 11/522,838

(22) Filed: Sep. 18, 2006

(65) Prior Publication Data

US 2008/0070523 A1   Mar. 20, 2008

(51) Int. Cl.
*H04W 4/00* (2009.01)
*H04B 7/00* (2006.01)

(52) U.S. Cl. ...................................... 455/434; 455/41.2

(58) Field of Classification Search ................. 455/41.2, 455/41.3, 67.11, 432.2, 435.1, 450, 434, 455/160.1, 161.1, 422.1, 403, 426.1, 500, 455/515, 517, 412.1; 370/338; 358/473, 358/474

See application file for complete search history.

(56) References Cited

U.S. PATENT DOCUMENTS

| | | | |
|---|---|---|---|
| 2005/0289061 A1* | 12/2005 | Kulakowski et al. | 705/50 |
| 2006/0203784 A1* | 9/2006 | Cromer et al. | 370/338 |
| 2007/0248058 A1* | 10/2007 | Fajardo et al. | 370/338 |

\* cited by examiner

*Primary Examiner* — Eugene Yun

(74) *Attorney, Agent, or Firm* — Lee & Hayes, PLLC

(57) ABSTRACT

Embodiments of techniques to perform passive and active scanning in a wireless network are presented herein.

16 Claims, 3 Drawing Sheets

PASSIVE AND ACTIVE SCANNING IN WIRELESS NETWORK

BACKGROUND

The prevalence of wireless communication continues to expand as user's desire the convenience of wireless communication between devices. One area of wireless communication that has experienced significant expansion is the connection of clients (e.g., a wireless handheld device, laptop, and so on) with network stations, such as to access local or wide area networks, e.g., a corporate intranet, the Internet and so on. Traditional techniques that were employed to locate network stations, however, could be inefficient in certain instances and therefore needlessly consume time of a user of the client and the resources of the client itself in locating the network station.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform passive and active scanning techniques. Exemplary procedures are then described that may be employed in the exemplary environment, as well as in other environments.

Exemplary Environment

Figure 1:
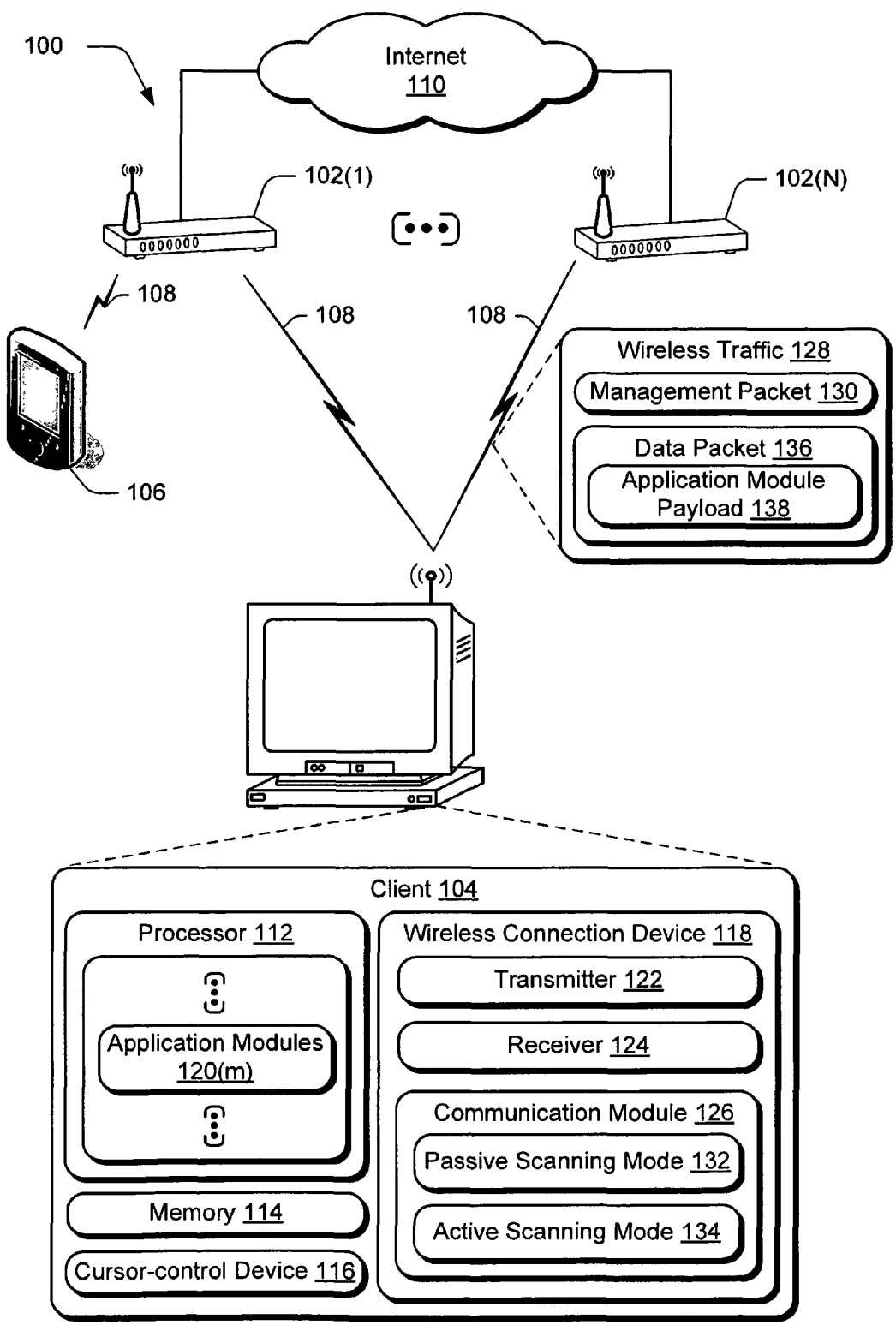
FIG. 1 is an illustration of an environment in an exemplary implementation that is operable to employ techniques to perform passive and active scanning in a wireless network.

FIG. 1 is an illustration of an environment 100 in an exemplary implementation that is operable to employ passive and active scanning techniques. The illustrated environment 100 includes a plurality of network stations 102(1)-102(N), a client 104 and another client 106 that are communicatively coupled via a wireless network 108, which is illustrated through the use of bolts in FIG. 1. In the illustrated implementation, the network stations 102(1)-102(N) are configured to provide access to the Internet 110, but may also be configured to provide access to a variety of other networks, such as a corporate intranet, a wireless personal area network, a wireless wide area network, and so on.

The clients 104, 106 may be configured in a variety of ways for wireless network 108 access. For example, one or more of the clients 104, 106 may be configured as a computing device, such as a desktop computer, a mobile station, an entertainment appliance, a wireless phone, a personal digital assistant, and so forth. Thus, the clients 104, 106 may range from full resource devices with substantial memory and processor resources (e.g., personal computers) to low-resource devices with limited memory and/or processing resources (e.g., personal digital assistants). The clients 104, 106, in portions of the following discussion, may also relate to a person and/or entity that operate the clients. In other words, one or more of the clients 104, 106 may describe logical clients that include users, software, and/or devices.

The client 104 in the illustrated environment 100 includes a processor 112, memory 114, a cursor-control device 116 and a wireless connection device 118. Further, the client 104 is illustrated as executing one or more application modules 120(m) on the processor 112, which are storable in memory 114. For example, the cursor-control device 116 may be utilized to provide inputs to application modules 120(m) to provide a wide variety of functionality, such as to navigate the Internet 110 using a web browser, perform instant messaging, and so on. Thus, the application modules 120(m) may include functionality enabled at least in part through use of the wireless network 108.

Processors are not limited by the materials from which they are formed or the processing mechanisms employed therein: For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 114 is shown, a wide variety of types and combinations of memory may be employed, such as random access memory (RAM), hard disk memory, removable medium memory, and other types of computer-readable media.

The wireless connection device 118 is configured to provide wireless communication, such as with the network stations 102(1)-102(N). As such, the wireless connection device 118 includes a transmitter 122 to transmit data (e.g., packets) and a receiver 124 to receive data. The wireless connection device 118 is also illustrated as having a communication module 126 that is representative of functionality to manage communication performed by the wireless connection device 118.

For example, the wireless network 108 may be used to communicate a wide variety of wireless traffic 128 between a plurality of devices, e.g., the network stations 102(1)-102(N), the clients 104, 106, and so on. Accordingly, techniques are typically employed such that the wireless network 108 does not become "oversaturated" and therefore prevent and/or severely limit use of the wireless network 108, such as due to collision. By employing these techniques to manage communication in the wireless network 108, communication may be performed by the client 104 without unduly affecting communication performed by the other client 106, and vice versa.

One traditional technique that was used to manage the wireless traffic was through the use of passive scanning to locate network stations 102(1)-102(N) over the wireless network. For example, some regulatory restrictions mandate that passive scanning is to be performed for at least a predetermined amount of time or until a beacon packet is received from one or more of the network stations 102(1)-102(N). The beacon packet is a type of management packet 130 that is used by the network stations 102(1)-102(N) to enable the wireless connection device 118 to locate the respective network stations 102(1)-102(N). However, passive scanning may consume a significant amount of time, especially when used to passively scan multiple channels in succession.

The wireless connection device 118, therefore, may employ techniques to switch from a passive scanning mode 132 to an active scanning mode 134 as soon as "legal" wireless traffic 128 is detected on a wireless channel. The wireless connection device 118, for instance, may enter a passive scanning mode 132 and listen for wireless traffic 128. During this passive scanning, the wireless connection device 118 may detect a packet communicated over the wireless network 108. The packet may be configured in a variety of ways, such as a management packet 130 (e.g., a type of packet used to manage the wireless network 108) or a data packet 136, e.g., a data packet 136 having an application module payload 138 that is to be used by execution of an application module.

As soon as a packet is detected and regardless as to the type (e.g., management or data) of the packet that is detected, the wireless connection device 118, and more particularly the communication module 126, may switch to the active scanning mode 134. When in the active scanning mode 134, the wireless connection device 118 may "ping" the wireless network 108 to locate the wireless connection devices 102(1)-102(N). For example, the wireless connection device 118 may form a packet to be broadcast that, when received by the network stations 102(1)-102(N), causes the network stations 102(1)-102(N) to form and transmit a packet back to the wireless connection device 118 in response. In an implementation, the active scanning may be performed in an amount of time that is generally less than the predetermined amount of time used to listen for beacon packets in the passive scanning mode 132 and may therefore improve efficiency in locating the network stations 102(1)-102(N) over traditional techniques.

The packet that is detected may originate from a variety of different sources, such as from the network station 102(1)-102(N), from the other client 106 to communicate with the network stations 102(1)-102(N), and so on. Thus, the client 104 may also switch from the passive scanning mode 132 to the active scanning mode 134 upon detection of a packet that originated "outside" of the network stations 102(1)-102(N). In this way, the switch from the passive scanning mode 132 to the active scanning mode 134 may be performed regardless of the "type" (e.g., management or data) of packet and even "who" sent the packet. Further discussion of switching from passive to active scanning modes may be found in relation to the following procedures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory 114. The features of the active and passive scanning described below are platform-independent, meaning that the techniques may be implemented on a variety of commercial computing platforms having a variety of processors.

Exemplary Procedures

The following discussion describes passive and active scanning techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
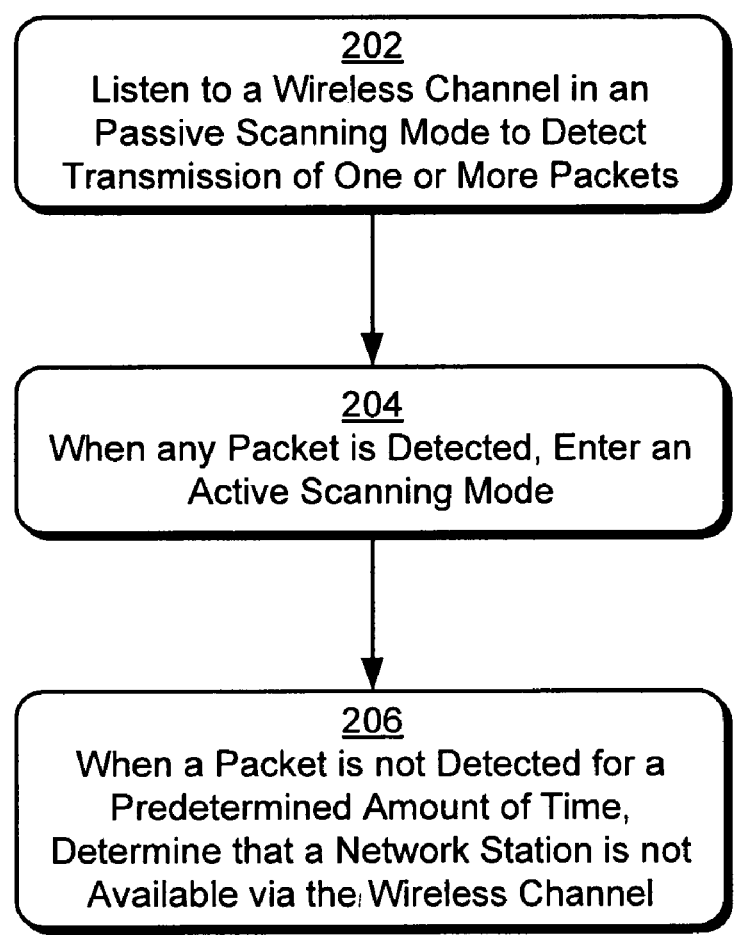
FIG. 2 is a flow diagram depicting a procedure in an exemplary implementation in which detection of packet on a wireless channel is used to switch from a passive scanning mode to an active scanning mode.

FIG. 2 depicts a procedure 200 in an exemplary implementation in which detection of a packet on a wireless channel is used to switch from a passive scanning mode to an active scanning mode. Although this implementation describes scanning performed by a wireless connection device, this scanning may be performed by a variety of devices.

Listening is performed in a passive scanning mode to a wireless channel to detect transmission of one or more packets (block 202). The wireless connection device 118, for example, may "tune" to: a wireless channel using the receiver 124 and listen for a packet, such as a packet in compliance with one or more Institute of Electrical and Electronics Engineers 802.11 standards.

When any packet is detected, an active scanning mode is entered (block 204). Continuing with the previous example, the wireless connection device 118 may receive a management packet 130 that is to be used in the management of a wireless connection, such as in compliance with one or more protocols and wireless standards that are usable to form, maintain and terminate a wireless connection. Once such management packet 130 is a beacon packet that may be used by network stations 102(1)-102(N) to indicate availability, although other management packets are also contemplated.

The wireless connection device 118, through use of the receiver 124, may also receive a data packet that has a payload that is to be used "outside" of the management of the wireless connection, such as an application module payload 138 that is usable by one or more application modules 120($m$). In other words, the data packet may include data that is to be used by software other than that employed by the wireless connection device and/or the network station. A variety of other examples are also contemplated. Thus, regardless of the "type" (e.g., management or data) of packet or source of the packet, detection of packet may be used to enter the active scanning mode. In this way, the active scanning mode may be entered through detection of a packet other than a beacon packet.

When a packet is not detected for a predetermined amount of time, a determination is made that a network station is not available via the wireless channel (block 206). As previously described, passive scanning may be performed for a predetermined amount of time to locate network stations. Therefore, when a packet is not detected during that period of time, it may be determined that network stations are not available via that wireless channel. A variety of actions may then be taken, such as notification to application modules 120($m$) being executed on the client 104 as to the unavailability, tuning to another wireless channel and repeating the procedure 200, and so on.

Figure 3:
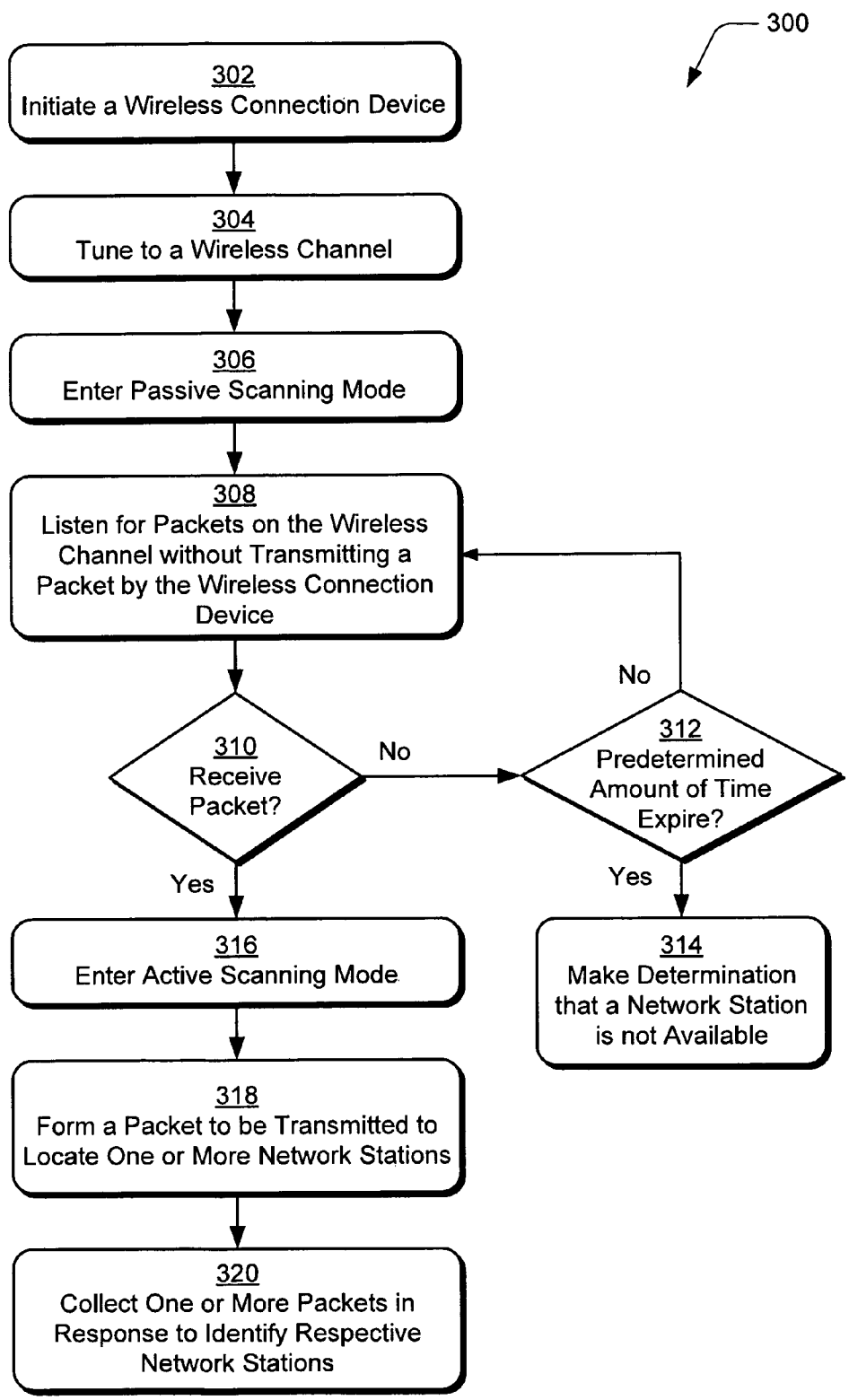
FIG. 3 is a flow diagram depicting a procedure in an exemplary implementation in which a wireless connection device is initiated and subsequently searches for network stations using passive and active scanning techniques.

FIG. 3 depicts a procedure 300 in an exemplary implementation in which a wireless connection device is initiated and subsequently searches for network stations using passive and active scanning techniques. A wireless connection device is initiated (block 302). For example, the client 104 when configured as a computer may perform a boot up procedure, during which, the wireless connection device configured as a wireless network interface card is initiated.

The wireless connection device tunes to a wireless channel (block 304), such as by tuning the receiver 124, and enters a passive scanning mode (block 306). While in the passive scanning mode, the wireless connection devices listens for packets on the wireless channel without transmitting a packet (block 308) that would cause a response to be sent by one or more network stations. In other words, while in the passive scanning mode the wireless connection device does not "ping" the wireless network 108 to locate the network stations 102(1)-102(N), if any.

A determination is made as to whether a packet has been received (decision block 310). For example, the decision may be based on whether the packet complies with one or more wireless connection standards, such as through use of a permissible header and so on.

When a packet has not been received ("no" from decision block 310) a determination is made as to whether the predetermined amount of time has expired (decision block 312). If not ("no" from decision block 312), the wireless connection device continues listening for packets (block 308) in the passive scanning mode. When the predetermined amount of time has expired ("yes" from decision block 312), a determination is made that a network station is not available.

When a packet has been received ("yes" from decision block 310), an active scanning mode is entered (block 316). When in the active scanning mode, a packet is formed to be transmitted to locate one or more network stations (block 318). The formed packet may thus be utilized to query whether one or more network stations are available over the wireless network 108. The wireless connection device may then collect one or more packets in response to identify respective network stations (block 320). The collected packets, for instance, may identify particular network stations such that the wireless connection device may initiate a wireless connection over the wireless channel, such as to access the Internet, a corporate intranet, and so on. A variety of other instances are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
a receiver to receive packets having payloads, over a wireless communication channel; and
a module having a passive scanning mode and an active scanning mode to locate network stations, wherein the active scanning mode is to be entered when a packet is detected in the passive scanning mode, using the receiver, during the passive scanning mode, wherein the packet includes an application payload for execution by an application module of the apparatus.

2. An apparatus as described in claim 1, wherein the passive scanning mode is to be performed for a predetermined amount of time.

3. An apparatus as described in claim 2, wherein the module is configured to enter the active scanning mode before the predetermined amount of time has expired.

4. An apparatus as described in claim 2, wherein the module is to determine that network stations are not available over the wireless communication channel when a packet is not detected during the predetermined amount of time.

5. An apparatus as described in claim 1, wherein:
the active scanning mode is to be entered when a management packet is detected; and
the management packet is to configure operation of a wireless connection device that includes the receiver and the module.

6. An apparatus as described in claim 1, wherein the data packet is not a beacon packet transmitted by a network station.

7. An apparatus as described in claim 1, wherein the data packet is to include a payload that is to be used during execution of an application module.

8. An apparatus as described in claim 1, wherein the data packet is to be transmitted by another client to a network station.

9. An apparatus as described in claim 1, wherein the data packet is in compliance with one or more Institute of Electrical and Electronics Engineers 802.11 standards.

10. One of more computer-readable media comprising computer executable instructions that are executable to cause a wireless network connection device to listen to a wireless channel to detect transmission of one or more packets for and perform active scanning to locate one or more network stations when a management or data packet that includes an application payload for execution by an application at the wireless network connection device, wherein the active scanning mode is to be entered when the management or data packet is detected in passive scanning mode.

11. One or more computer-readable media as described in claim 10, wherein the active scanning is to include forming a packet when the management or data packet is detected to detect one or more network stations.

12. One or more computer-readable media as described in claim 10, wherein the computer-executable instructions configure the wireless network connection device to determine that a network station is not available when the management or data packet is not detected during the predetermined amount of time.

13. A system comprising:
a processor;
memory configured to maintain one or more application modules that are executable on the processor;
a cursor control device to provide user inputs during execution of the one or more application modules; and
a wireless connection device to provide data to the one or more application modules, wherein:
the wireless connection device includes a passive scanning mode and an active scanning mode to locate network stations; and
the active scanning mode is to be entered when transmission of a data packet that includes an application payload to be executed by the one or more application modules, is detected during the passive scanning mode.

14. A system as described in claim 13, wherein the active scanning mode is to be entered by the wireless connection device when transmission of a management packet is detected.

15. A system as described in claim 13, wherein:
the passive scanning mode is to be performed by the wireless connection device for a predetermined amount of time; and
when the predetermined amount of time has expired without detecting a packet, the wireless connection device forms a communication to be communicated to at least one of the application modules when executed on the processor, the communication indicating that a network station is not available.

16. A system as described in claim 13, wherein the wireless connection device is to communicate in compliance with one or more Institute of Electrical and Electronics Engineers 802.11 standards.

* * * * *